United States Patent
Ohran

(10) Patent No.: US 7,389,312 B2
(45) Date of Patent: Jun. 17, 2008

(54) MIRRORING NETWORK DATA TO ESTABLISH VIRTUAL STORAGE AREA NETWORK

(75) Inventor: Michael R. Ohran, Orem, UT (US)

(73) Assignee: EMC Corporation, Hopkinton, MA (US)

( * ) Notice: Subject to any disclaimer, the term of this patent is extended or adjusted under 35 U.S.C. 154(b) by 496 days.

(21) Appl. No.: 09/892,161

(22) Filed: Jun. 26, 2001

(65) Prior Publication Data

US 2001/0037371 A1 Nov. 1, 2001

Related U.S. Application Data

(63) Continuation-in-part of application No. 09/271,585, filed on Mar. 18, 1999, now Pat. No. 6,560,617, which is a continuation of application No. 08/848,139, filed on Apr. 28, 1997, now Pat. No. 5,978,565.

(51) Int. Cl.
G06F 12/00 (2006.01)
G06F 17/30 (2006.01)
G06F 7/00 (2006.01)
G06F 15/16 (2006.01)
G06F 15/167 (2006.01)

(52) U.S. Cl. .............. 707/204; 707/9; 707/10; 707/104.1; 709/201; 709/203; 709/212; 709/213; 709/216; 709/217; 709/227

(58) Field of Classification Search .............. 707/1, 707/8–10, 100, 104.1, 204, 206, 200, 201, 707/104; 709/201, 203, 204, 200, 212, 213, 709/216, 217, 219, 224, 227, 229, 214, 232, 709/1; 714/4, 6, 1; 711/111, 114, 147, 1, 711/127, 162; 370/417

See application file for complete search history.

(56) References Cited

U.S. PATENT DOCUMENTS 4,792,896 A 12/1988 Maclean et al.

(Continued)

FOREIGN PATENT DOCUMENTS

EP 0433979 A2 * 12/1990

(Continued)

OTHER PUBLICATIONS

Teorey, Toby J. and Pinkerton, Tad B.; "A Comparative Analysis of Disk Scheduling Policies"; ACM; Mar. 1972; vol. 15; No. 3; pp. 177-184.*

(Continued)

Primary Examiner—Ella Colbert
(74) Attorney, Agent, or Firm—Workman Nydegger

(57) ABSTRACT

Mirroring data to provide a virtual storage area network using policing protocols and mirror engines without a physical shared storage node. The mirror engines are found at each server computer in the network in order to mirror the data between mass storage devices of the servers as the servers receive and execute write operations, which results in each mass storage device containing the same stored data. The policing protocols prevent data corruption by not allowing more than one server at a time write to a file of data. If one server experiences failure and is incapable of providing access to network data, the other server or servers can service all read requests, since all network data is accessible by all servers. Unlike conventional storage area networks, there is no physical shared storage node and, accordingly, the costs of obtaining and operating the virtual storage area network are relatively small.

35 Claims, 8 Drawing Sheets

U.S. PATENT DOCUMENTS

| | | | |
|---|---|---|---|
| 5,005,122 A | 4/1991 | Griffin et al. | 364/200 |
| 5,148,540 A * | 9/1992 | Beardsley et al. | 714/5 |
| 5,157,663 A | 10/1992 | Major et al. | 371/9.1 |
| 5,241,672 A * | 8/1993 | Slomcenski et al. | 707/202 |
| 5,276,867 A | 1/1994 | Kenley et al. | 395/600 |
| 5,307,481 A | 4/1994 | Shimazaki et al. | 395/575 |
| 5,343,477 A | 8/1994 | Yamada | 371/8.2 |
| 5,403,639 A | 4/1995 | Belsan et al. | 395/600 |
| 5,408,649 A | 4/1995 | Beshears et al. | 395/575 |
| 5,432,922 A * | 7/1995 | Polyzois et al. | 714/6 |
| 5,455,932 A | 10/1995 | Major et al. | 395/489 |
| 5,488,716 A | 1/1996 | Schneider et al. | 395/182.08 |
| 5,513,314 A | 4/1996 | Kandasamy et al. | 395/182.04 |
| 5,515,502 A | 5/1996 | Wood | 395/182.13 |
| 5,530,855 A | 6/1996 | Satoh et al. | 395/600 |
| 5,533,191 A | 7/1996 | Nakano | 395/182.09 |
| 5,537,533 A * | 7/1996 | Staheli et al. | 714/5 |
| 5,537,585 A | 7/1996 | Blickenstaff et al. | 395/600 |
| 5,544,347 A | 8/1996 | Yanai et al. | 395/489 |
| 5,555,371 A | 9/1996 | Duyanovich et al. | |
| 5,600,784 A | 2/1997 | Bissett et al. | |
| 5,611,049 A * | 3/1997 | Pitts | 707/8 |
| 5,633,999 A | 5/1997 | Clowes et al. | 395/182.04 |
| 5,659,704 A * | 8/1997 | Burkes et al. | 711/114 |
| 5,666,479 A | 9/1997 | Kashimoto et al. | 395/180 |
| 5,764,903 A * | 6/1998 | Yu | 709/208 |
| 5,835,953 A * | 11/1998 | Ohran | 711/162 |
| 5,917,998 A * | 6/1999 | Cabrera et al. | 714/6 |
| 5,933,653 A * | 8/1999 | Ofek | 710/6 |
| 5,987,627 A * | 11/1999 | Rawlings, III | 714/48 |
| 6,047,356 A * | 4/2000 | Anderson et al. | 711/129 |
| 6,073,209 A * | 6/2000 | Bergsten | 711/114 |
| 6,112,257 A * | 8/2000 | Mason et al. | 710/18 |
| 6,167,531 A * | 12/2000 | Sliwinski | 714/13 |
| 6,324,654 B1 * | 11/2001 | Wahl et al. | 714/6 |
| 6,397,348 B1 * | 5/2002 | Styczinski | 714/6 |
| 7,055,059 B2 * | 5/2006 | Yanai et al. | 714/7 |

FOREIGN PATENT DOCUMENTS

| | | | |
|---|---|---|---|
| JP | 10-307783 | | 11/1998 |
| WO | WO 95/00906 | * | 6/1994 |
| WO | WO 94/25919 | | 11/1994 |
| WO | WO 99/46680 | | 9/1999 |

OTHER PUBLICATIONS

Chen, Shenze and Towsley, Don; "Performance of a Mirrored Disk in a Real-Time Transaction System"; ACM; 1991; pp. 198-207.*

Cao, Pei, Felten, Edward W., Karlin, Anna R., Li, Kai; "Implementation and Performance of Integrated Applicantion-Controlled File Caching, Prefetching, and Disk Scheduling"; Nov. 1996; vol. 14; No. 4; pp. 311-343.*

Steinberg, Jeffrey A., "*Diverting Data From Disaster*," Digital Review, vol. 8, No. 35, Nov. 18, 1991.

* cited by examiner

MIRRORING NETWORK DATA TO ESTABLISH VIRTUAL STORAGE AREA NETWORK

RELATED APPLICATIONS

This application is a continuation-in-part of U.S. patent application Ser. No. 09/271,585, entitled "Operation of Standby Server to Preserve Data Stored By a Network Server," filed Mar. 18, 1999, now issued as U.S. Pat. No. 6,560,617, which is a continuation of U.S. patent application Ser. No. 08/848,139, filed Apr. 28, 1997, entitled "Method for Rapid Recovery from a Network File Server Failure Including Method for Operating Co-Standby Servers," now issued as U.S. Pat. No. 5,978,565. The foregoing patent applications are incorporated herein by reference.

BACKGROUND OF THE INVENTION

1. The Field of the Invention

This invention relates to network server computer systems, and in particular an improvement to the methods used to recover from a computer failure in a system that provides a virtual storage area network, in which multiple server computers access the same network data.

2. Background and Related Art

In a network server computer system, there are a plurality of personal computers or user workstations that are usually supported by two or more servers. In order to provide continuous operation of these computer systems, it is necessary for the computer system to provide a method for overcoming faults and failures that often occur within the network server computer system. This is generally done by having redundant computers and mass storage devices, such that a backup server computer or disk drive is immediately available to take over in the event of a fault or failure of a primary server computer or disk drive. A technique for implementing a fault-tolerant computer system is described in Major et al., U.S. Pat. No. 5,157,663. In particular, Major provides a redundant network file server system capable of recovering from the failure of either the computer or the mass storage device of one of the file servers. The file server operating system is run on each computer system in the network file server, with each computer system cooperating to produce the redundant network file server. This technique has been used by Novell, of Provo, Utah, to implement its SFT-III fault-tolerant file server product.

More recently, fault-tolerant networks known as "storage area networks" have been developed. A storage area network ("SAN") connects multiple servers of an enterprise network with a common or shared storage node to store and access network data. In the case of a failure of one of the servers, the other servers can perform network services that would otherwise have been provided by the failed server.

FIG. 1 illustrates a typical architecture of a network system that includes a conventional storage area network. FIG. 1 illustrates three server computers 110, 120, and 130 that provide network services for network 101. Although three servers are illustrated in FIG. 1, network 101 may include as few as two servers or more servers than are shown in FIG. 1. This variable number of server computers depends upon the individual needs of the network being served. For example, a large organization may require the use of several server computers, likewise a smaller organization might simply require two server computers.

In this configuration, user workstations (or personal computers) 102a, 102b, 102c, and 102n are connected to network 101 and have access to server computers 110, 120, and 130. Each user workstation is generally associated with a particular sever computer, although, in a network system that includes a storage area network, any server can provide substantially any network services for any workstation, as needed. A user, at a user workstation 102a, 102b, 102c, and 102n, issues requests for operations, such as read, write, etc., which are transmitted to the associated server computer, 110, 120, or 130, which then performs the requested operation using I/O drivers 113, 123, and 133. Servers 110, 120, and 130 perform data operations on network data that is stored in disks 142 of shared storage node 140 usmnn connections 115, 125, and 135. Each server 110, 120, and 130 has access to any network data stored at shared storage node 140, subject to policing protocol described below. The storage area network of FIG. 1 includes the physical communication infrastructure and the protocols that enable server computers 110, 120, and 130 to operate with shared storage node 140.

Each server computer includes software representing a policing protocol module 111, 121, 131, that cooperates with the policing protocol modules of the other server computers to implement a policing protocol. The policing protocol prevents data corruption by controlling the performance of requested operations. For example, the policing protocol implemented by modules 111, 121, and 131 may allow a server to respond to read operation requests at any time, but may permit only one server computer at a time to perform a write operation request.

One advantage of SANs is that all server computers have access to all network data through the shared storage node. If one server experiences a failure, workstations can bypass the failed server and issue operation requests to other servers. The shared storage node prevents the need for mirroring data between multiple storage nodes associated with different servers. However, storage area networks have at least two significant liabilities that have prevented them from becoming fully accepted in the marketplace and make them unsuitable for many customers.

First, SANs require specialized hardware, namely, the shared storage node. Many potential users of storage area networks find the cost of purchasing and maintaining a shared storage node prohibitive. In practice, many users of SANs are large corporations or other enterprises that have relatively large networks with large numbers of servers. Enterprises that have the need for only two or three servers may not find it cost-effective to implement a storage area network.

Second, although SANs are tolerant of failures of network servers, they are not well suited for responding or protecting against other hardware failures. For example, because a storage area network uses a single shared storage node, any failure or problem associated with the shared storage node can cause the SAN to go off-line and also to potentially lose data that has been stored in the shared storage node. Accordingly, the basic SAN configuration does not provide a high degree of data integrity and may not be acceptable for use in organizations in which the risk of data loss is not acceptable.

SUMMARY OF THE INVENTION

The present invention relates to computer networks that provide virtual storage area networks without using a physical shared storage node. According to the invention, the network includes two or more servers, each having its own disk for storing network data. In the following discussion, a network having two servers is considered. However, the principles described in reference to two servers can be extrapolated to networks having more than two servers.

When a user workstation in the network issues a write operation request to one of the servers, the server receiving the request executes the write operation at its disk and uses a mirror engine and a dedicated link to transmit the write operation request to other server. Upon receiving the mirrored write operation request, the other server executes the write operation at its disk. In this manner, data written to the disk of one server is also written to the disk of another server, thereby causing the network data to be mirrored and stored at both disks.

Since the same network data exists on the disk of both servers, either server can respond to read operation requests from any user workstation. Policing protocol modules at each server cooperate to implement a policing protocol, which regulates the timing and priority by which each server accesses the network data. For instance, the policing protocol can specify that only one server at a time can execute write requests on particular portions of the network data, thereby preventing the data from being corrupted.

Because the data is mirrored and stored at the disk of each server in the network, the network can easily tolerate the failure of one of the servers. For instance, if the first server experiences a failure, the other server has access to all network data stored at its disk and it can service all operation requests using its own disk. Because the same network data is stored at the disk of each server in the network, the data appears, from the standpoint of the servers, to have been stored in a shared storage node. Therefore, the invention provides a virtual storage area network that responds operation requests and the failure of network servers in a manner similar to the way in which actual storage area networks would respond to failure, in that each server has immediate access to all network data.

The virtual storage area network and virtual shared storage nodes of the invention have significant advantages compared with conventional storage area networks. For instance, the networks of the invention do not require a physical shared storage node. Accordingly, much of the cost associated with conventional storage area networks are eliminated. Reduced costs of operating the networks of the invention make them compatible with enterprises having networks with as few as two servers.

In addition, mirroring and storing the same network data in the disks of multiple servers, in contrast to using a physical shared storage node, results in the networks of the invention being significantly more tolerant of disk failure than conventional storage area networks. For instance, if the disk of one of the servers of a network operated according to invention were to fail, the disk of the other server in the network would have stored thereon all network data. In contrast, if the physical shared storage node of a conventional storage area network were to fail, the data stored thereon could be lost or, at the very least, the data would be temporarily inaccessible.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to networks in which network data is mirrored and stored on disks of multiple servers, such that the multiple servers provide a virtual storage area network without having a physical shared storage node. Each of the multiple servers in the network has a disk on which network data is stored and a mirror engine enabling the server to communicate with other servers in the network. When the server receives a write operation request, the server executes the write operation at its disk and transmits the write operation request to the other servers in the network using the mirror engine and the dedicated link or other means for communicating. The other servers receive the write operation request and execute the write operation at the disks of their corresponding servers. In this way, the same network data is stored at the disks of each of the multiple servers. In the case of failure of one of the servers or the disk associated with any server, the other server or servers remaining in the network can provide network services for any user workstation in the network using the network data stored in the disks corresponding to such servers.

A. Exemplary Operating Environments

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 2:
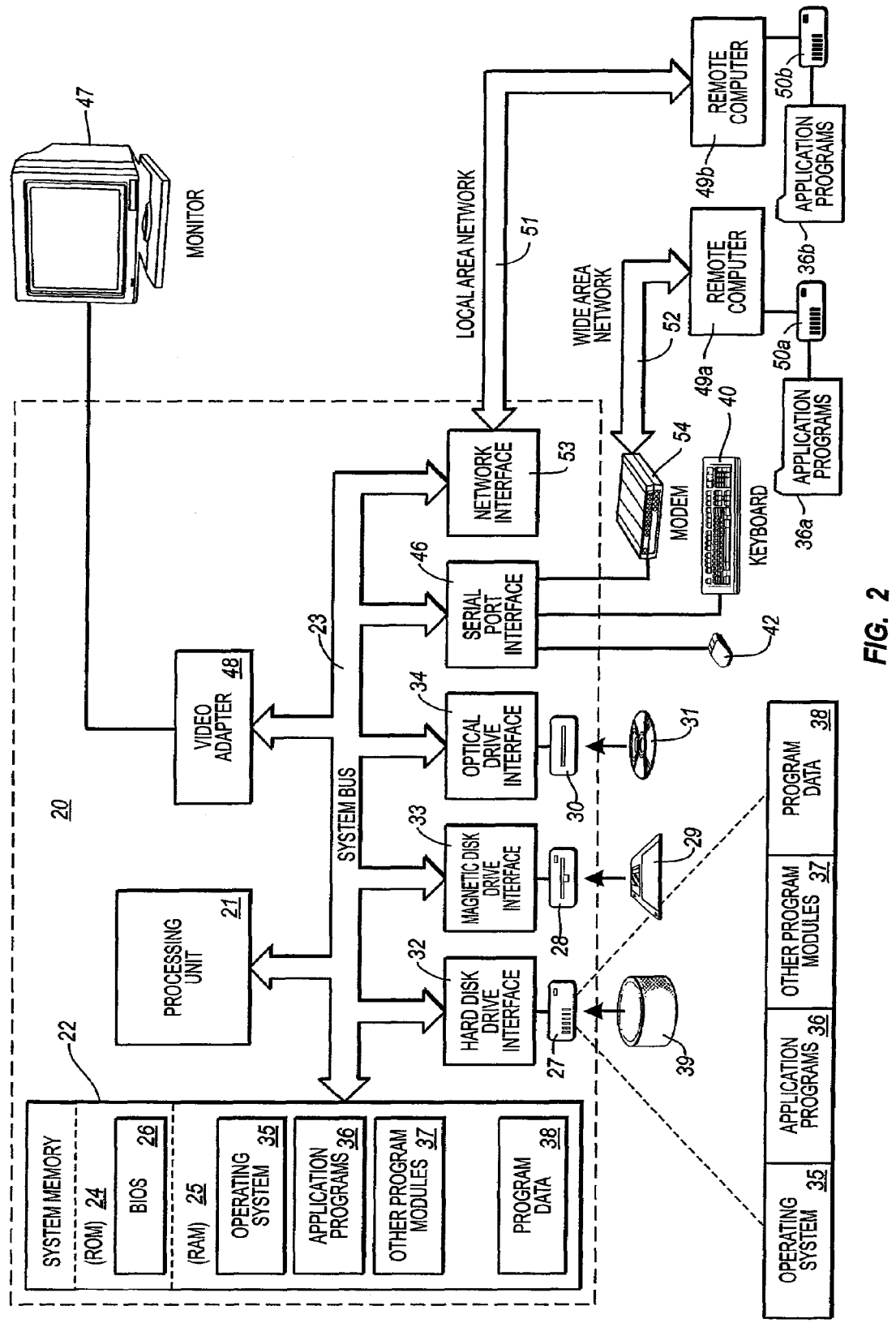
FIG. 2 illustrates an exemplary system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 2, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. Any of the foregoing structures represent examples of storage devices or storage volumes that can be used to establish virtual storage area networks as described herein. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 2. The logical connections depicted in FIG. 2 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

B. Virtual Storage Area Networks

Figure 3:
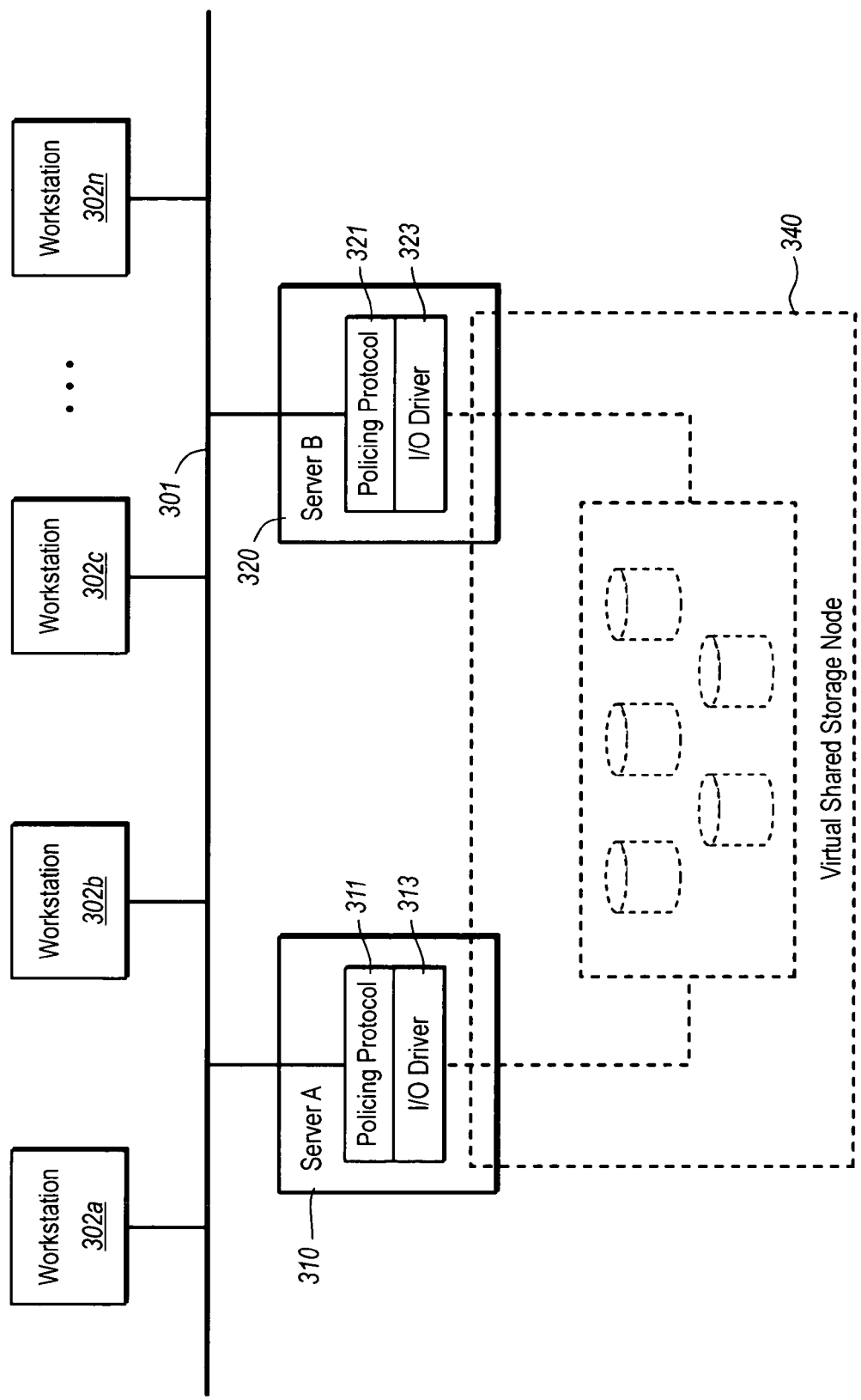
FIG. 3 is a schematic diagram illustrating a fault-tolerant network according to the invention, and shows a virtual shared storage node.

FIG. 3 illustrates a representative configuration of a virtual storage area network of the invention. For purposes of illustration, two server computers 310 and 320 provide network services for network 301 in the example of FIG. 3. However, the architecture of the networks of the invention can be readily scaled to networks having three or more servers, examples of which are discussed below in reference to FIG. 5. Network 301 also includes any number of user workstations 302*a*, 302*b*, 302*c*, and 302*n*, which can be personal computers or any other computing device that receives network services from servers 310 and 320.

Each server 310 and 320 includes a policing protocol module 311, 321 and an input/output device driver 313, 323. Server A 310 and server B 320 operate together to establish a virtual shared storage node 340. Virtual shared storage node 340 is not a physical shared storage node, such as shared storage node 140 of FIG. 1. Instead, virtual shared storage node 340 includes various hardware and software components that will be described in greater detail in reference to FIG. 4, which provide functionality that, from the standpoint of the I/0 drivers 313 and 323, appear to be associated with an actual shared storage node. Thus, in this sense, network 301 includes a virtual shared storage node 340 and the portion of network 301 that enables servers 310 and 320 to access virtual shared storage node 340 represents a virtual storage area network.

Figure 1:
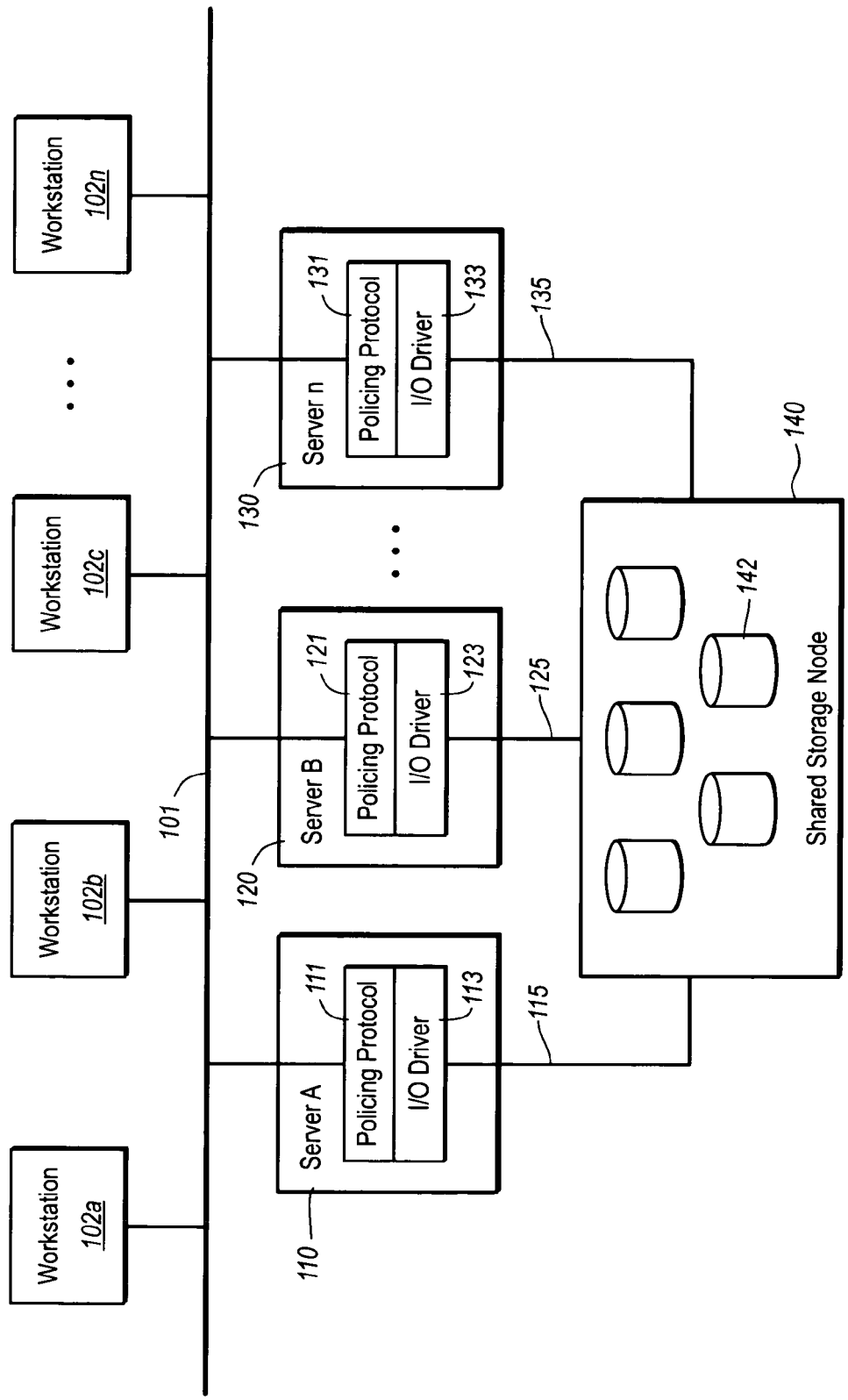
FIG. 1 illustrates a network system that includes a conventional storage area network having a physical shared storage node.

It is also noted that the network configuration, including the hardware and software, of network 301 outside of the region of FIG. 3 designated as virtual shared storage node 340 can be similar to or substantially identical to the corresponding components of existing networks and similar to or substantially identical to the corresponding components of conventional actual storage area networks, such as the network 101 illustrated in FIG. 1. One advantage of the networks operated according to the invention is that they are compatible with existing policing protocol software and other software that currently exists for use with conventional storage area networks.

Figure 4:
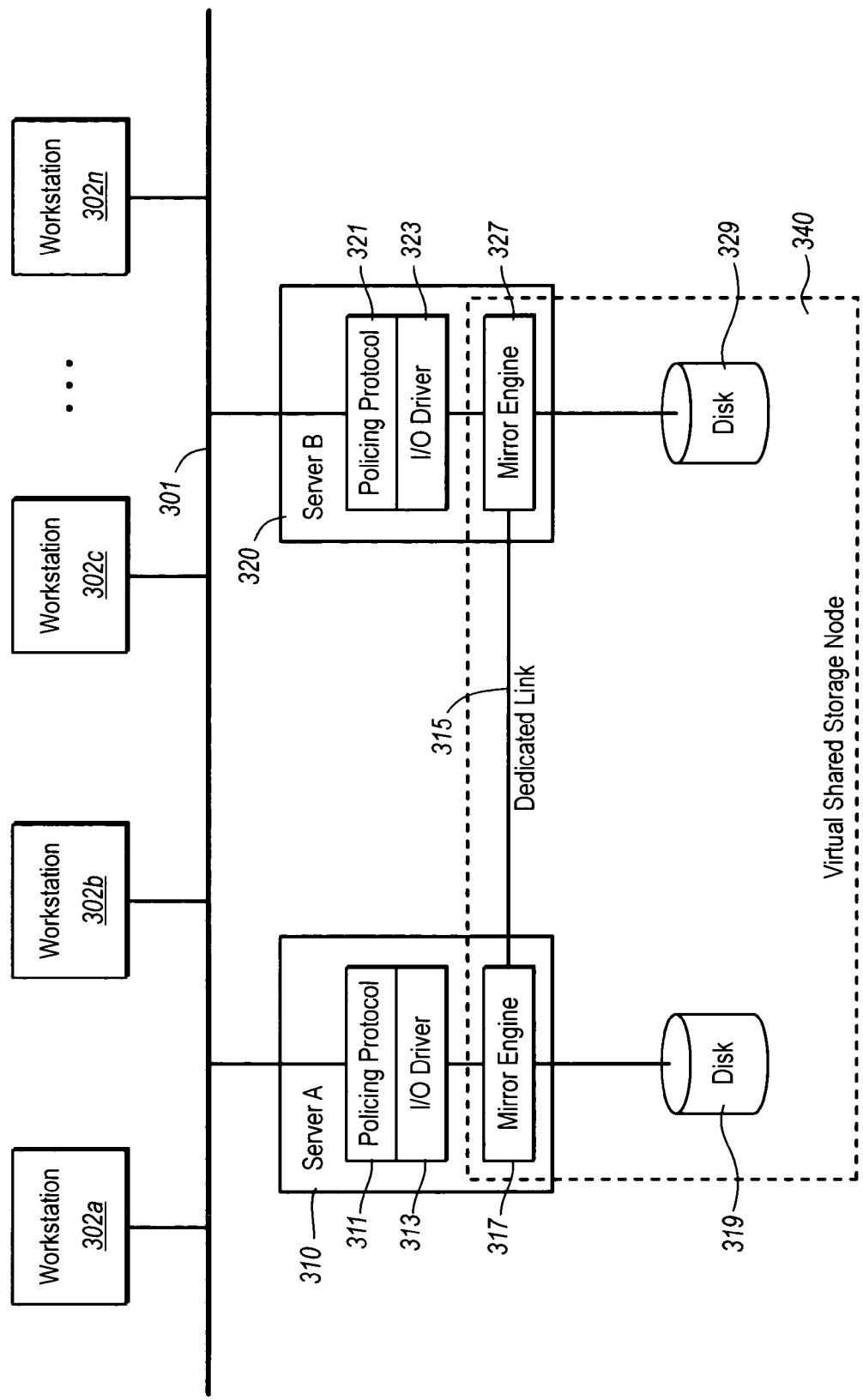
FIG. 4 is a schematic diagram illustrating the fault-tolerant network of FIG. 3, showing the hardware and other components that provides the functionality of the virtual shared storage node of FIG. 3.

Referring to FIG. 4, it can be seen that the physical components of the virtual shared storage node 340 are significantly different from the components of actual shared storage node 140 of the conventional storage area network of FIG. 1. For instance, network 301 of FIG. 4 does not include a physical shared storage node, which eliminates much of the expense associated with acquiring and operating a storage area network. Instead, server 310 has its own disk 319, while server 320 has its own disk 329. Thus, servers 310 and 320 can be ordinary or conventional network servers, each having its own disk. In other words, the hardware of servers 310 and 320 can be similar or identical to the hardware of the majority of servers that are currently used in enterprise networks other than actual storage area networks. As used herein, "disk" and "mass storage device" are to be interpreted broadly to include any device or structure for storing data to perform the methods described herein.

The components that enable such servers 310 and 320 to provide the functionality of a virtual storage area network include mirror engines 317 and 327 and dedicated link 315. Mirror engines 317 and 327 represent examples of means for mirroring data between mass storage devices or disks of different servers. Other structures that correspond to means for mirroring data can also be used with the invention to perform the functions described herein. Moreover, as noted above, policing protocol modules 311 and 321 and other software operating at servers 310 and 320 outside of the region of FIG. 4 designated as virtual shared storage node 340 can be similar or identical to existing software that has been conventionally used to operate policing protocols and other functions of actual storage area networks.

Figure 6:
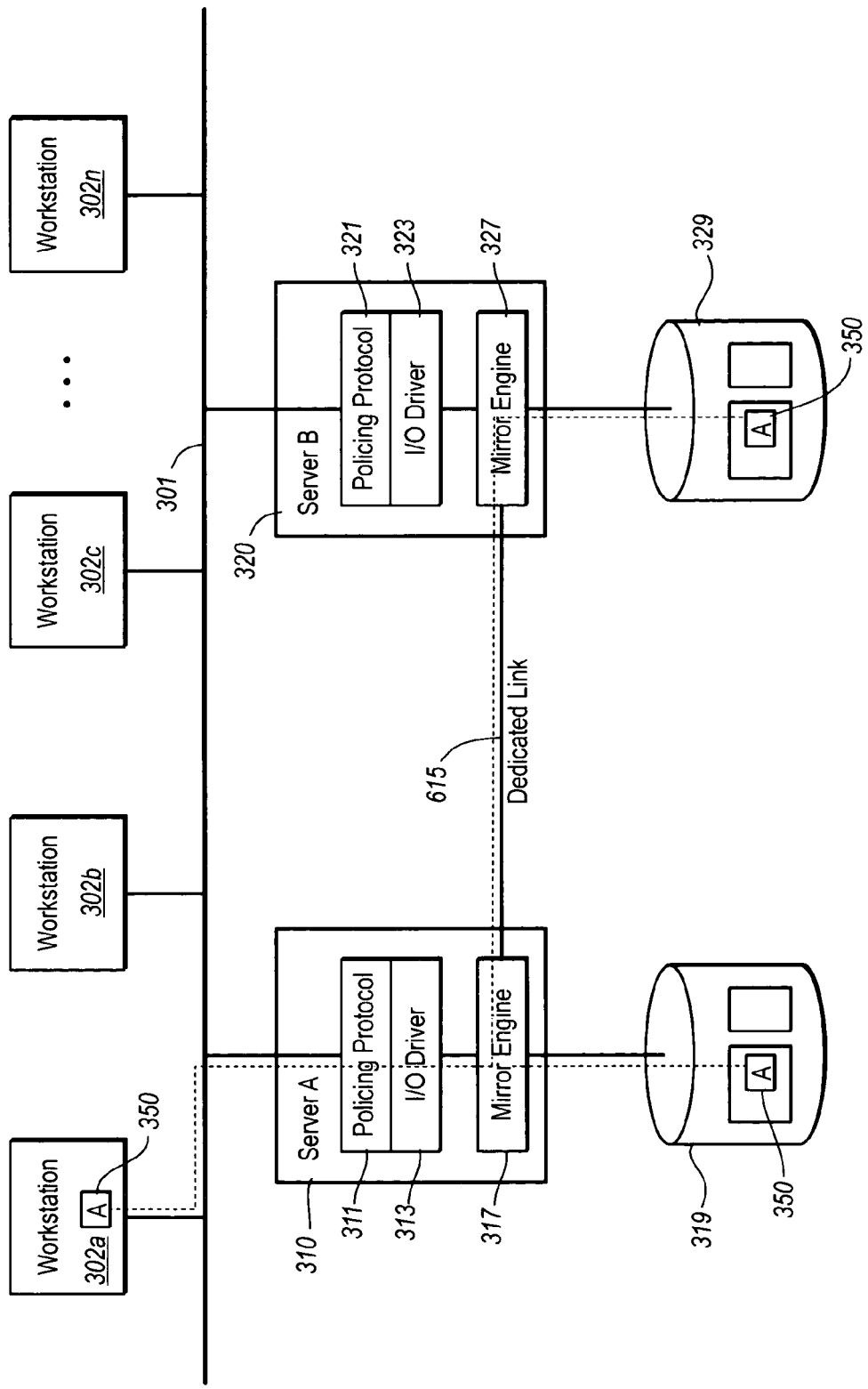
FIGS. 6 and 7 illustrate methods for mirroring network data between disks associated with two servers, thereby providing each of the servers with access to the network data.
Figure 7:
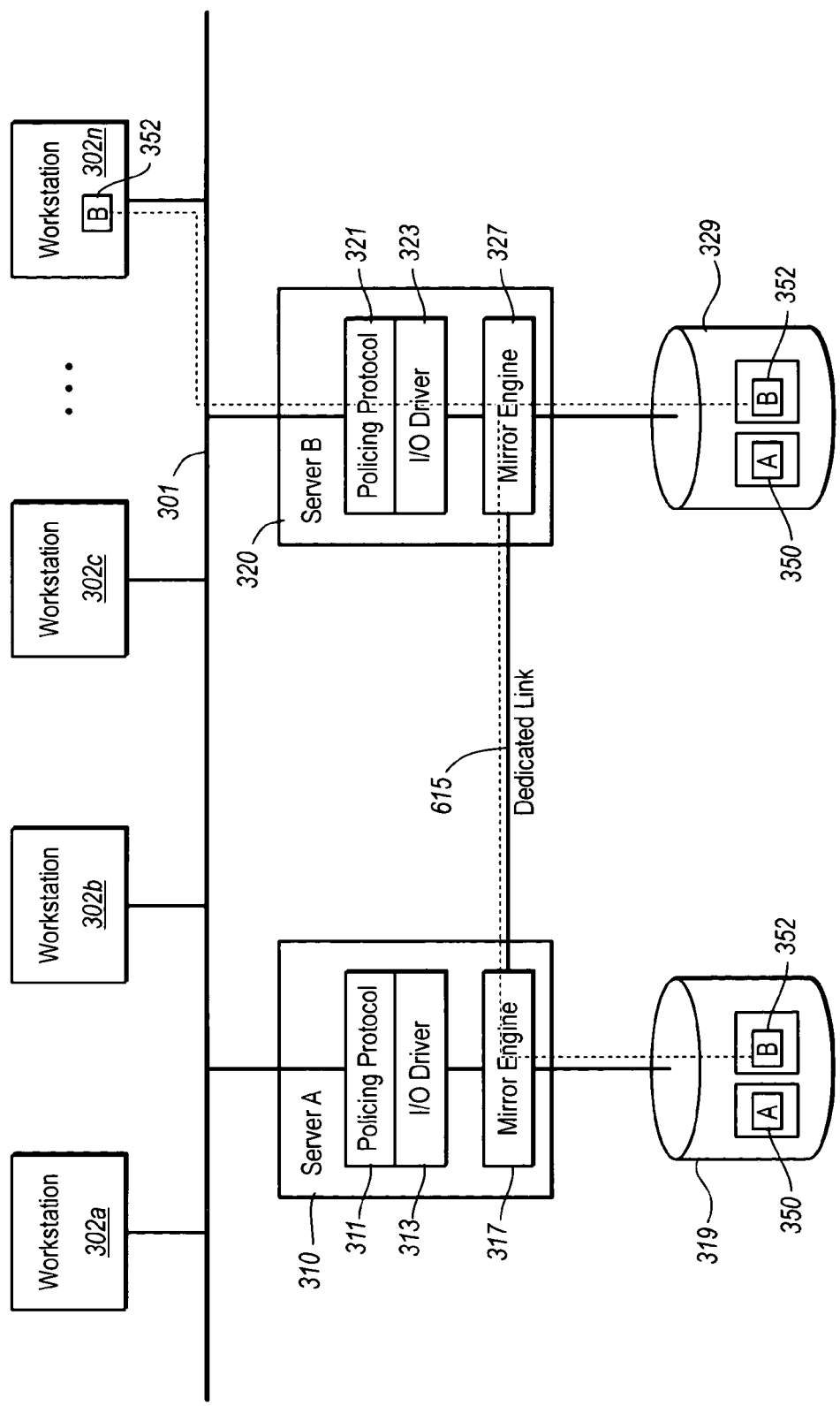

FIGS. 6 and 7 illustrate the manner in which mirror engines 317 and 327 and dedicated link 615 can be used to mirror data on disks 319 and 329, thereby enabling each of servers 310 and 320 to have access to all network data. As shown in FIG. 6, a user of user workstation 302*a* causes the user workstation to issue a write operation request for writing a data block A 350 to a disk associated with network 301. As shown in FIG. 6, the write operation request is transmitted through network 301 to server A 310. Since any of the servers (e.g. server A 310 or server B 320) of network 301 can process all operation requests from any user workstation, the manner in which a particular server 310 or 320 is selected to process this operation is not critical to the invention. In order to balance the load between servers 310 and 320, any desired load balancing algorithms can be implemented. Alternatively, particular servers can be assigned to particular user workstations on a default basis.

In this example, server A 310 receives the write operation request and passes the request to I/O driver 313. I/O driver 313 then transmits the write operation request to what could be perceived, from the standpoint of I/O driver 313, as a virtual shared storage node (i.e., virtual shared storage node 340 of FIG. 4).

Policing protocol module 311 operates with policing protocol module 321 of server B 320 to determine whether server A 310 currently enjoys write access to disks 319 and 329. One primary purpose of policing protocol modules 311 and 321 is to ensure that no more than a single server has write access to particular sectors or data block in disks 319 and 329 at any single time. Since each server 310, 320 typically has access to all network data, allowing any server to have write access to the disks at all times without implementing the policing protocols could otherwise lead to data corruption. Because, from the standpoint of I/O drivers 313 and 323 and policing protocol modules 311 and 321, server A 310 and server B 320 appear to use a virtual shared storage node, the policing protocols used with the invention can be similar or identical to policing protocols conventionally used with actual storage area networks. In other words, as has been previously mentioned, much of the software operating on server A 310 and server B 320 can be similar or identical to the corresponding software used with actual storage area networks.

Since conventional policing protocols can be used with the invention, the nature of policing protocols will be understood by those skilled in the art. In general, policing protocols, whether used with conventional storage area networks or the virtual storage area networks of the invention, determine whether a server having received an I/O request currently has access priority with respect to the other servers in the network. For instance, if server A 310 were to receive a write operation request, servers A 310 and servers B 320 communicate one with another over the network infrastructure of network 301 and use policing protocol modules 311 and 321 to determine which server has write access priority to the sector or other portion of the disks that is to receive the write operation. While many types of policing protocols can be used with the invention, many policing protocols have the common feature that they are distributed between the multiple servers and are executed as the multiple servers communicate one with another.

Returning now to FIG. 6, I/O driver transmits the write operation request to what is perceived by the I/O driver as being a virtual shared storage node. Physically, however, the write operation request is received by mirror engine 317. The write operation request is transmitted from mirror engine 317 to disk 319, where it is executed, resulting in data A 350 being written to a particular sector or other region of the disk. In order to mirror data A to disk 329, mirror engine 317 also transmits the write operation request to a corresponding mirror engine 327 of server B 320. The write operation request is transmitted by dedicated link 615 or another means for communicating. Other means for communicating may include one or combination of any wireless or hard-wire communication means. If dedicated link 615 is used, the physical dedicated link represents one physical difference between network 301 and conventional networks. Other embodiments of the invention are capable of mirroring the data using mirror engines 317 and 327 without dedicated link 615. For instance, the network infrastructure of network 301 that is otherwise used to transmit data between user workstations 302 and servers 310 and 320 can be used also to transmit mirrored write operation requests from one server to another. Dedicated link 615, the network infrastructure of network 301 and other means for communicating represent examples of means for communicating between servers and the mass storage devices or disks thereof.

In any event, mirror engine 327 receives the mirrored write operation request and transmits it to disk 329, where it is executed, resulting in data A 350 being written to disk 329. In this manner, after user workstation 302a issues the write operation request, the data associated with the write operation request is written to disk 319 and disk 329, such that both disks include mirrored copies of the same network data. It is also noted that a similar process is performed when one of the user workstations 302a, 302a, 302b, 302c, and 302n issues a write operation request that causes data to be deleted from a file or otherwise deleted from disk 319. In other words, if data is deleted from disk 319, the same data is deleted from disk 329, such that the same network data is mirrored and stored at both disks.

FIG. 7 illustrates another instance of data being mirrored between disks 319 and 329. In this case, user workstation 302n transmits a write operation request for writing data B 352 to disk 329. The write operation request is transmitted to server B 320, where it is processed by I/O driver 323 and policing protocol module 321 in a manner similar to that described above in reference to the write operation request for data A 350 of FIG. 6. In FIG. 7, mirror engine 327 transmits the write operation request to disk 329, where it is executed, resulting in data B being written to disk 329. In addition, mirror engine 327 transmits the write operation requests to the corresponding mirror engine 317 of server A 310 by dedicated link 34-5 615 or by another means for communicating associated with network 301. Mirror engine 317 then transmits the mirrored write operation request to disk 319, where it is executed, resulting in data B 352 being written to disk 319. Thus, FIGS. 6 and 7 illustrate how any server 310, 320 in network 301 is capable of causing data associated with write operation requests to be stored and mirrored at each of the disks 319, 329 of the servers in the network.

Figure 8:
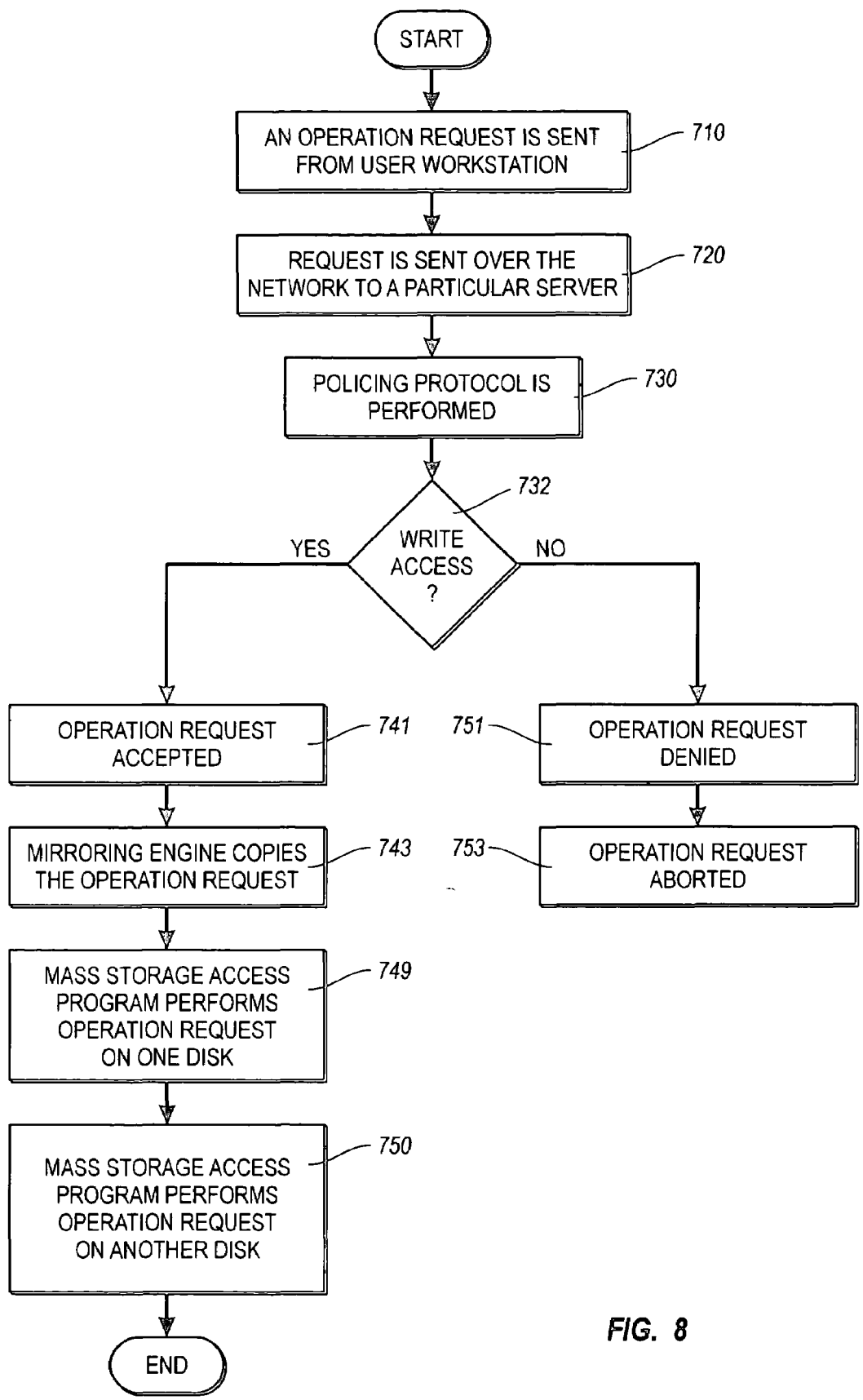
FIG. 8 is a flow diagram depicting a method for mirroring data between disks associated with two servers, thereby providing each of the servers with access to the network data.

FIG. 8 summarizes the method whereby write operation requests are processed and the associated data is mirrored to each of the disks in the network. In step 710 the user workstation issues a write operation request. In step 720, the request is transmitted over the network to a particular server. In step 730, the particular server executes the policing protocols to determine whether the server currently has write access to the disks in the network. If, according to decision block 732, the server does not have write access, the operation request is denied in step 751 and aborted in step 753. Alternatively, if, according to decision block 732, the server does not have write access, the operation can be queued until such time that write access is granted to the server.

If, according to decision block 732, the server does have write access, the operation request is accepted at step 741. The mirror engine then copies the write operation request in step 743 and transmits it to one or more other servers in the network. The particular server that received the write operation request executes the write operation at its disk in step 749. At the same time or just prior to or after step 749, step 750 is executed, in which the other server or servers in the network, which have received the mirrored copy of the write operation request, execute the mirrored write operation request, such that the same network data is also stored in the disks associated with the other server or servers. The order in which steps 743, 749 and 750 are conducted is not critical to the invention.

The manner in which network 301 can respond to and tolerate the failure of a server or disk is illustrated in reference to FIG. 7. In this example, it is assumed that data A 350 and data B 352 have already been mirrored to both disks 319 and 329 as described above. Prior to server A 310 going offline, server A advertises the fact that it can provide access for workstations to the virtual shared storage node, illustrated at 340 of FIG. 4, such that any workstation requiring services of the disks of the virtual shared storage node can receive them through server A 310. In normal operation, server A 310 provides access to the virtual shared storage node by using disk 319. In this example, it is assumed that server A 310 remains operational, but its associated disk 319 goes offline and becomes unavailable for any reason. Server A 310 continues to advertise to workstations that it can provide access to the virtual shared storage node, including disk 319 because, from the standpoint of server A 310, the virtual shared storage node and the data stored thereon remain available.

After the failure of disk 319, workstations 302a, 302b, 302c, and 302n can continue to issue read operation requests to be processed by the virtual shared storage node through server A 310. In this example, it is assumed that workstation 302a issues a read operation request directed to data A 350. Upon the read operation request being received by server A 310, the read operation request is received by I/O driver 313 and transmitted to mirror engine 317, which, as shown at FIG. 4, is within virtual shared storage node 340.

At this point, the read operation request has transmitted in the typical manner to a storage device that is perceived, from the standpoint of server A 310, as being a shared storage node. However, as mentioned above, disk 319 is not accessible and cannot service the read operation request. Accordingly, the read operation request is transmitted to server B 320 using dedicated link 615. The read operation request is then used to access disk 329, which has a full copy of the network data, including data A 350. Thus, network 301 is capable of seamlessly responding to inaccessibility of disk 319 by using mirror engines 317 and 327 to redirect read operation requests that are received by server A 310. Operation of network 301 continues uninterrupted notwithstanding the failure of disk 319. Moreover, server A 310 can respond to other network operation requests, such as write operation requests, in a similar manner after the failure of disk 319 by using the virtual shared storage node.

The foregoing method of responding to disk failure enables network activity to continue without disruption of any network activity that could have been partially completed at the time of the disk failure. Responding to disk failure in this way requires an operational I/O driver 313 and mirror engine 317 of server A 310.

If these functional components of server A 310 become inoperable, network 301 has a secondary way of continuing to provide access to network data according to one embodiment. In this scenario, if user workstation 302*a* were to issue a read operation request that would otherwise be processed by server A 310, the read operation request can be serviced by server B 320, since server B 320 has access to all network data on its disk 329. For purposes of illustration, it is assumed that the read operation request issued by user workstation 302*a* is directed to data A 350. Because server A 310 is offline, server B 320 processes the read operation request. Server B 320 uses the mirrored copy of the network data stored at disk 329 to service the read operation request and thereby provide user workstation with read access to data A 350. It is noted that conventional storage area networks also enable all servers to provide read access to all network data in the case of one of the servers of the network experiencing a failure or otherwise going offline. However, unlike conventional storage area networks, the networks of the invention do not use a physical shared storage node to provide access to all network data through any server.

The foregoing examples of the capability of the networks of the invention to continue operating after disk or server failure provide significant advantages that are not possible using a conventional storage area network. Typically, a conventional storage area network has a single component that, if it fails, can render the data inaccessible. For instance a typical conventional storage area network includes a SAN connection card or a disk driver that must be operational in order to provide access to the shared storage node.

In addition, physical failure of the disks of the shared storage node of a conventional storage area network can cause the loss of access to the data. Indeed, if shared storage node 140 of FIG. 1 were to be physically damaged or if data stored thereon were to be physically lost, the conventional storage area network might experience permanent and irretrievable loss of network data in addition to the down time associated with the failed shared storage node 140. In order to eliminate this possibility, administrators of conventional storage area networks can purchase and maintain in the shared storage node redundant arrays of independent disks (RAIDs), which increases the cost and complexity of the system. As described above, the present invention enables fault tolerance of disks in a virtual shared storage node without requiring RAIDs.

Figure 5:
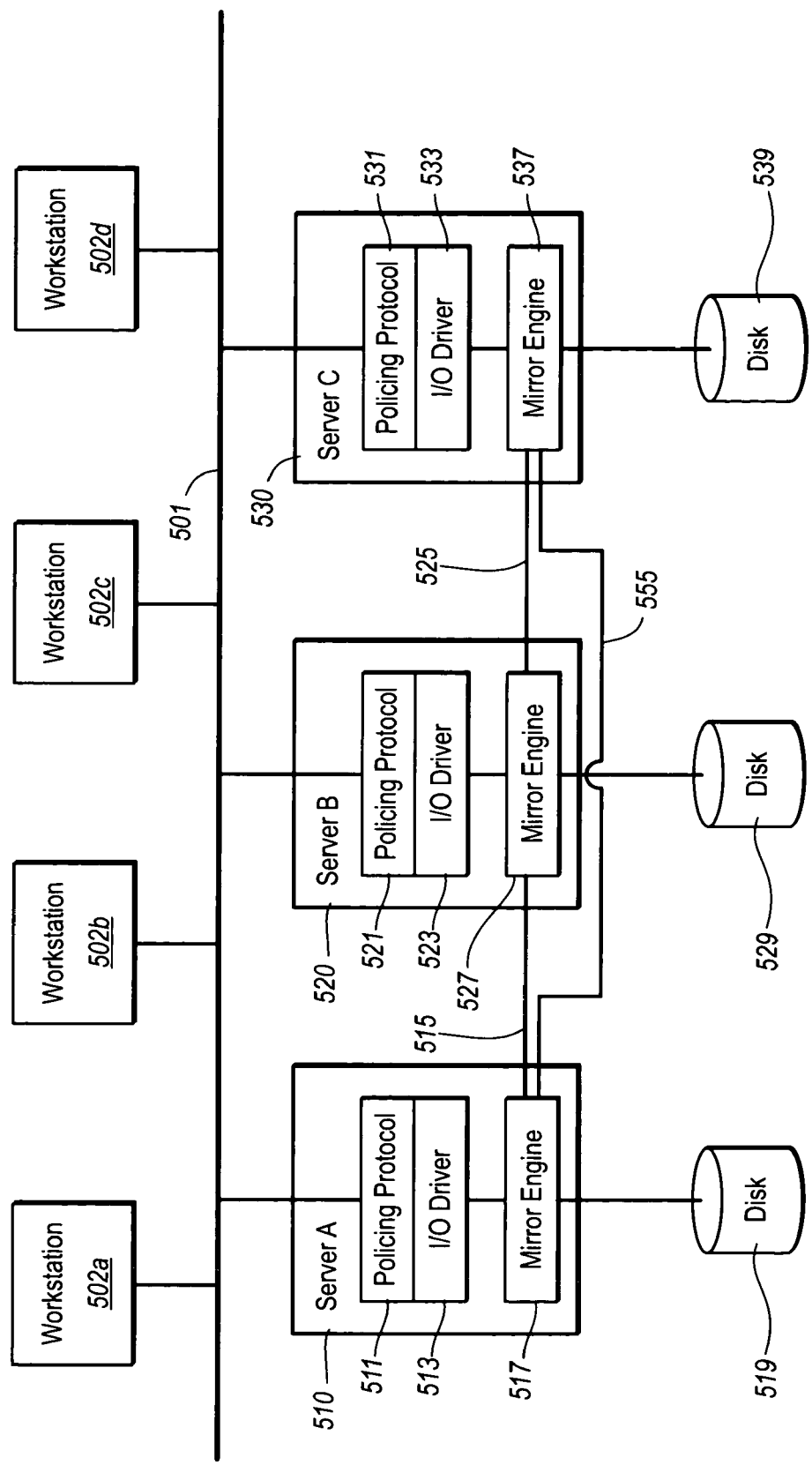
FIG. 5 is a schematic diagram depicting a network according to the invention having three servers.

The methods of invention illustrated in FIGS. 3, 4, 6 and 7 in reference to two servers can be scaled to networks having more than two servers. For instance, FIG. 5 illustrates a network according to the invention having three servers, namely, server A 520, server B 520 and server C 530. The operation of network 501 of FIG. 5 is similar to that of network 301 described above in reference to FIGS. 6 and 7. For instance, when server A receives a write operation request from at least one of the user workstations 502*a*, 502*b*, 502*c*, or 502*d*, the write operation request is processed by I/O driver 513. Policing protocol module 511 and server A 510 operate in combination with policing protocol module 521 of server B 520 and policing protocol module 531 of server C 530.

A mirror engine 517 of server A 510 transmits a copy of the write operation request to mirror engine 527 of server B 520 through dedicated link 515 or other another communications link. Mirror engine 517 also transmits a copy of the write operation request to mirror engine 537 of server C 530 through dedicated link 555 or other communications link. Again, it is noted that any other communications link can be used to transmit the copies of the write operation request to the various mirror engines of the other servers in the network. For instance, the network infrastructure of network 501 can be used to transmit such write operation request. Alternatively, a write operation request can be transmitted from mirror engine 517 to mirror engine 537 by transmitting the operation request sequentially through dedicated link 515, mirror engine 527 and dedicated link 525. All that is important is that mirror engines 517, 527, and 537 be capable of communicating one with another. In the foregoing manner, data written to one of the disks 519, 529 and 539 is stored at all the disks. In the case of the failure of one of servers 510, 520, 530, remaining servers are capable of servicing all requests from any user workstations for any of the network data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method of mirroring data stored on a first server having a first mass storage device to a second server having a second mass storage device to establish a virtual storage area network that includes the first and second mass storage devices, the method comprising:
   receiving a write request at a first server from a network device, the first server connected to a first mass storage device;
   determining that the first server has write access to both the first mass storage device and to a second mass storage device by performing a policing protocol in response to the write request;
   using an I/O driver of the first server, executing the write request at the first server to write data to the first mass storage device;
   using a mirror engine of the first server, transmitting a copy of the write request from the first server to a second mirror engine of the second server; and
   executing the copy of the write request at the second server by the second mirror engine of the second server to write the data to the second mass storage device without processing the write request using an I/O driver of the second server, such that the data is mirrored at the second mass storage device, and such that the data is stored in a virtual shared storage node from the standpoint of the first server and the second server.

2. A method of mirroring data as recited in claim 1, wherein transmitting a copy of the write request comprises transmitting the copy of the write request using a dedicated link between the first server and the second server.

3. A method of mirroring data as recited in claim 1, wherein transmitting a copy of the write request comprises transmitting the copy of the write request using an infrastructure of the network, so that the infrastructure is used by the network to transmit data between workstations and servers.

4. A method of mirroring data as recited in claim 1, further comprising:
   experiencing a failure such that the data is not accessible from the first mass storage device; and
   executing a read request for data that has been written to the first mass storage device by accessing the data that has been mirrored at the second mass storage device.

5. A method of mirroring data as recited in claim 4, wherein the failure comprises the first server going offline.

6. A method of mirroring data as recited in claim 4, wherein the failure comprises a failure of the first mass storage device.

7. A method of mirroring data as recited in claim 1, further comprising using the policing protocol, prior to executing the write request at the first server, to determine whether the first server has write access.

8. A method of mirroring data stored on a first server having a first mass storage device to a second mass storage device of a second server so that the data is accessible to the first server and the second server through a virtual storage area network formed between the first server and the second server, the virtual storage area network including a virtual shared storage node that physically includes a first mass storage device connected with the first server, a second mass storage device connected with the second server, means for mirroring data between the first mass storage device and the second mass storage device, and means for communicating between the first server and the second server, the method comprising:
receiving a write request that specifies that data is to be written to the virtual shared storage node;
determining that the first server has write access to the virtual shared storage node by performing a policing protocol in response to the write request, including write access to the first mass storage device and write access to the second mass storage device;
writing the data to the first mass storage device, the data at the first mass storage device being accessible by the first server; and
using a mirror engine of the first server, transmitting a copy of the write request from the first server to a second mirror engine of the second server so that the data can be mirrored to the second mass storage device by a second mirror engine of the second server, the data at the second mass storage device being accessible by the second server.

9. A method of mirroring data as recited in claim 8, wherein transmitting a copy of the write request comprises using the first mirror engine to initiate transmission of the copy of the write request to the second mirror engine.

10. A method of mirroring data as recited in claim 8, further comprising:
experiencing a failure such that data is not accessible from the second mass storage device; and
executing a read request for other data, so that the other data has been stored in the virtual shared storage node in response to the second server having received a write request specifying that said other data is to be written to the virtual shared storage node, the read request being executed by accessing the data from the virtual shared storage node.

11. A method of mirroring data as recited in claim 10, wherein executing the read request by accessing the data from the virtual shared storage node comprises accessing the data from the first mass storage device.

12. A method of mirroring data stored on a first mass storage device of a first server to a second mass storage device of a second server to establish a virtual storage area network that includes the first mass storage device and the second mass storage device, the method comprising:
receiving a write request at a first server, the first server connected with a first mass storage device;
using a policing protocol module associated with the first server, determining that a second server does not currently have write access priority to a portion of the first mass storage device or a portion of a second mass storage device, the second mass storage device connected to the second server; and
providing the first server with write access priority to the portion of the first mass storage device and to the portion of the second mass storage device, and, while the first server has write access priority to the portion of the first mass storage device and to the portion of the second mass storage device:
executing the write request at the first server to write data to said portion of the first mass storage device; and
using a second mirror engine of the first server, transmitting a copy of the write request from the first server to the second server so that the data can be written to the second mass storage device while the first server has write access priority, so that the first server and the second server can have access the data.

13. A method of mirroring data as recited in claim 12, wherein using the policing protocol module comprises the first server communicating to the second server to determine that the second server does not currently have write access priority.

14. A method of mirroring data as recited in claim 13, wherein communicating is performed by communicating over infrastructure of the network, so that the infrastructure is also used by the network to transmit data between workstations and servers.

15. A method of mirroring data as recited in claim 12, further comprising:
experiencing a failure such that data is not accessible from the second mass storage device; and
executing a read request for other data, so that the other data has been mirrored to the first mass storage device in response to the second server having received another write request specifying that said other data is to be stored, the read request being executed by accessing the data from the first mass storage device.

16. A virtual storage area network configured so that a first server and a second server can access the same data from physically different mass storage devices, the virtual shared access network comprising:
a first server that receives write requests and read requests from network clients, the first server having:
a first mass storage device; and
a first mirror engine;
a second server that receives write requests and read requests from network clients, the second server having:
a second mass storage device; and
a second mirror engine; and
a means for communicating between the first mirror engine and the second mirror engine that performs at least the following functions:
issuing a write operation request in response to a write request received from a particular network client at one of the first server and the second server;
determining when the first server or the second server has write access to both the first mass storage device and the second mass storage device by performing a policing protocol in response to the write operation request;
enabling the first mirror engine to mirror to the second mass storage device first data using the second mirror engine of the second server, so that the first data is also to be written to the first mass storage device; and enabling the second mirror engine to mirror to the first mass storage device second data using the first mirror engine of the first server, so that the second data is also to be written to the second mass storage device, so that the first server and the second server can access the same data from physically different mass storage devices.

17. A virtual storage area network as recited in claim 16, wherein the means for communicating comprises a dedicated link between the first mirror engine and the second mirror engine.

18. A virtual storage area network as recited in claim 16, wherein the means for communicating is included in infrastructure of the network, so that the infrastructure is also used by the network to transmit data between workstations and servers.

19. A virtual storage area network as recited in claim 16, further comprising a third server that receives write requests and read requests from network clients, the third server having:
  a third mass storage device; and
  a third mirror engine that mirrors data to the first mass storage device and the second mass storage device data that is to be written to the third mass storage device.

20. A virtual storage area network as recited in claim 19, further comprising means for communicating between the third server and the first server and also between the third server and the second server.

21. A virtual storage area network as recited in claim 16, wherein the first server and the second server execute the policing protocol to determine whether a server, upon receiving a write request, has write access priority for writing data to the first mass storage device and the second mass storage device.

22. A virtual storage area network as recited in claim 21, wherein the policing protocol is configured so that
  the first server and the second server can write data to a particular portion of the first mass storage device and the second mass storage device in response to a write request when the policing protocol determines that the write request has priority over any other write request that might be pending for the particular portion of the first mass storage device and the second mass storage device, and
  the write request is queued until the write request is granted to the first server and the second server when the policing protocol determines that the write request does not have priority over any other write request that might be pending for the particular portion of the first mass storage device and the second mass storage device.

23. A virtual storage area network as recited in claim 21, wherein:
  the first server further has a first policing protocol module; and
  the second server further has a second policing protocol module, so that the first policing protocol module and the second policing protocol module are used together to execute the policing protocol.

24. A method of mirroring data stored on a first mass storage device of a first server to a second mass storage device of a second server to establish a virtual storage area network that includes the first mass storage device and the second mass storage device, the method comprising:
  receiving a write request at the first server, the first server connected with a first mass storage device;
  issuing a write operation request to a second server, the second server connected with a second mass storage device, so that the first mass storage device and the second mass storage device appear as a virtual shared storage node to the first server and the second server;
  performing a policing protocol in response to the write operation request to ensure that the first server has write access to at least a portion of the first mass storage device and at least a portion of the second mass storage device;
  using an I/O driver of the first server, executing the write request at the first server to write data to the virtual shared storage node, so that a first mirror engine operating on the first server receives the write operation request;
  transmitting the write request to a second mirror engine of the second server; and
  without processing the write request using an I/O driver of the second server, executing the write request at the second server to write the data to the second mass storage device, such that the data is mirrored at the second mass storage device.

25. A method of mirroring data as recited in claim 24, wherein the data, from the standpoint of the first server and the second server, virtually appears to have been stored in a shared storage node of a storage area network.

26. A method of mirroring data as recited in claim 24, wherein transmitting the write request to the second server is performed by transmitting a copy of the write request that was executed at the first server.

27. A method of mirroring data as recited in claim 24, wherein transmitting the write request to the second server is performed by a mirroring engine.

28. A method of mirroring data as recited in claim 27, wherein the mirroring engine is associated with the first server.

29. A method of mirroring data as recited in claim 24, further comprising:
  experiencing a failure such that the data is not accessible from the first mass storage device; and
  executing a read request for data that has been written to the first mass storage device by accessing the data that has been mirrored at the second mass storage device.

30. A method of mirroring data as recited in claim 29, wherein the failure comprises the first server going offline.

31. A method of mirroring data as recited in claim 29, wherein the failure comprises a failure of the first mass storage device.

32. A method of mirroring data as recited in claim 24, wherein transmitting the write request comprises transmitting the write request using a dedicated link between the first server and the second server.

33. A method of mirroring data as recited in claim 24, wherein transmitting the write request comprises transmitting the write request using infrastructure of the network, so that the infrastructure is also used by the network to transmit data between workstations and servers.

34. A method of mirroring data as recited in claim 33, wherein executing the write request at the first server comprises using an I/O driver at the first server to initiate execution of the write request, so that, from the standpoint of the I/O driver, the write request virtually appears to have been stored in a shared storage node of a storage area network.

35. A method of mirroring data as recited in claim 24, further comprising using the policing protocol, prior to executing the write request at the first server, to determine whether the first server has write access.

* * * * *